Nov. 7, 1933.  R. J. WYNNE ET AL  1,934,247
BOTTLE WASHING MACHINE
Filed June 5, 1931    12 Sheets-Sheet 5
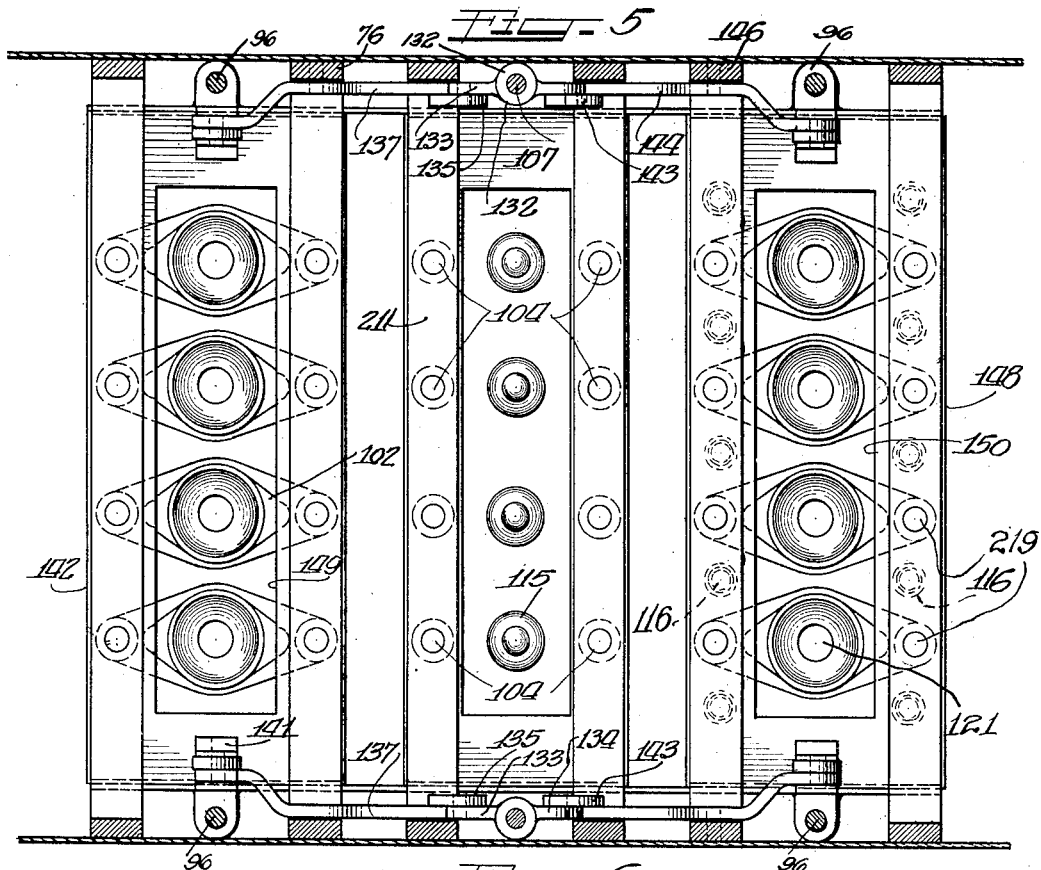
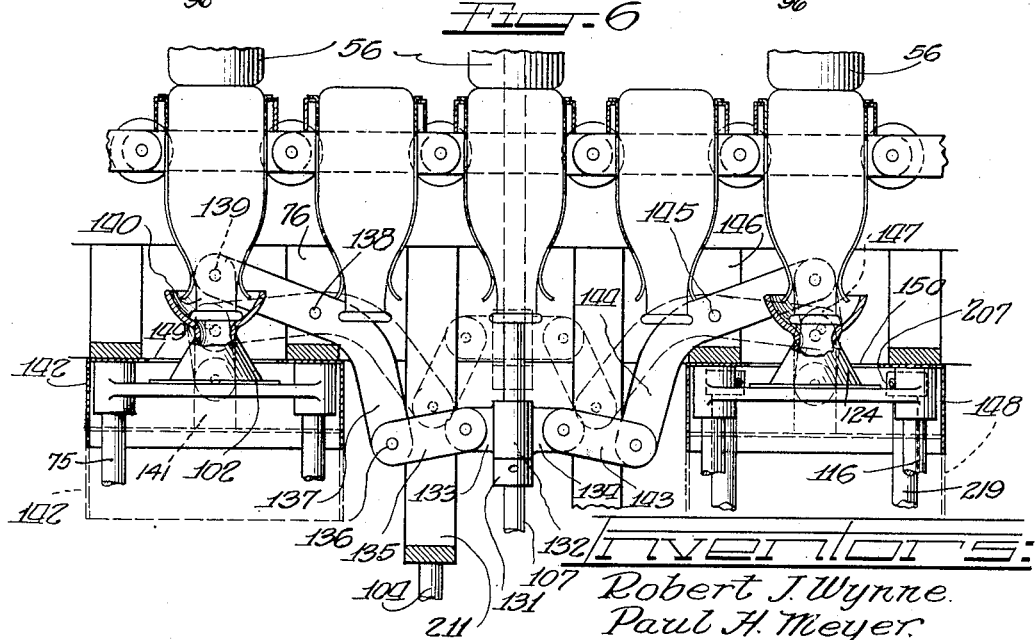

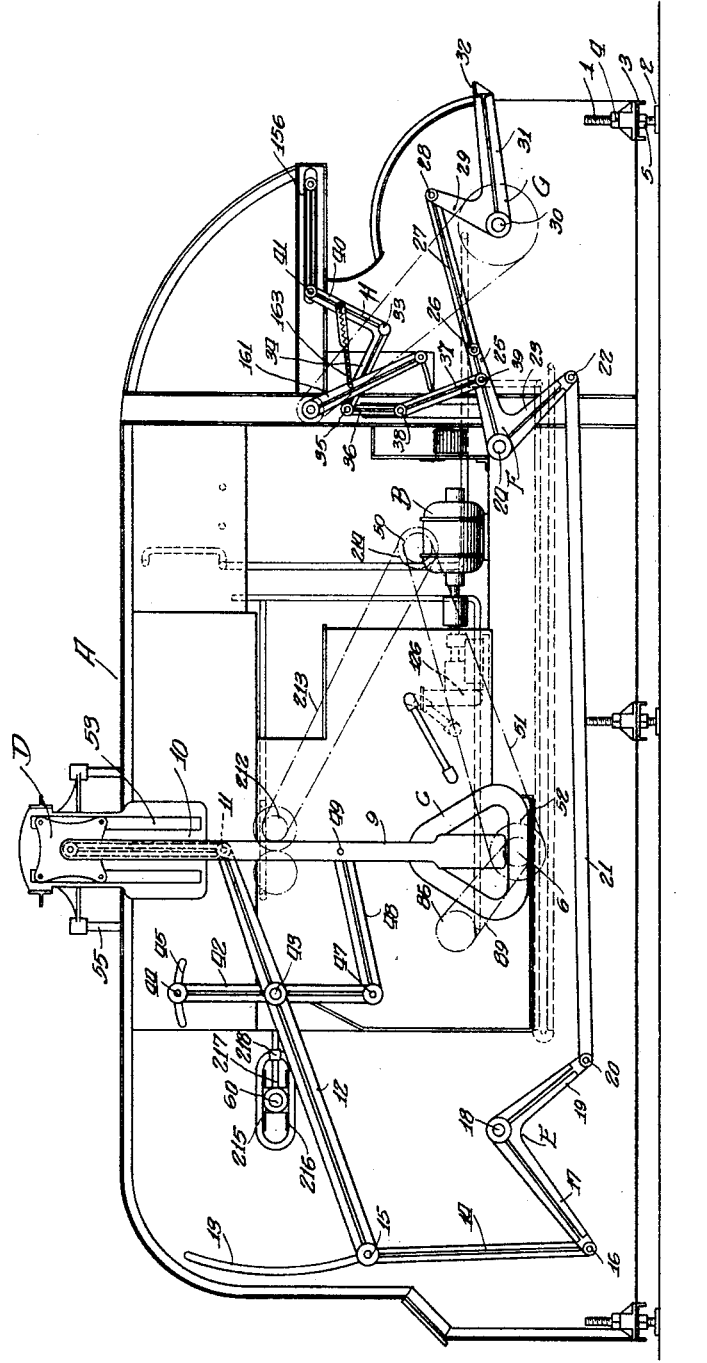

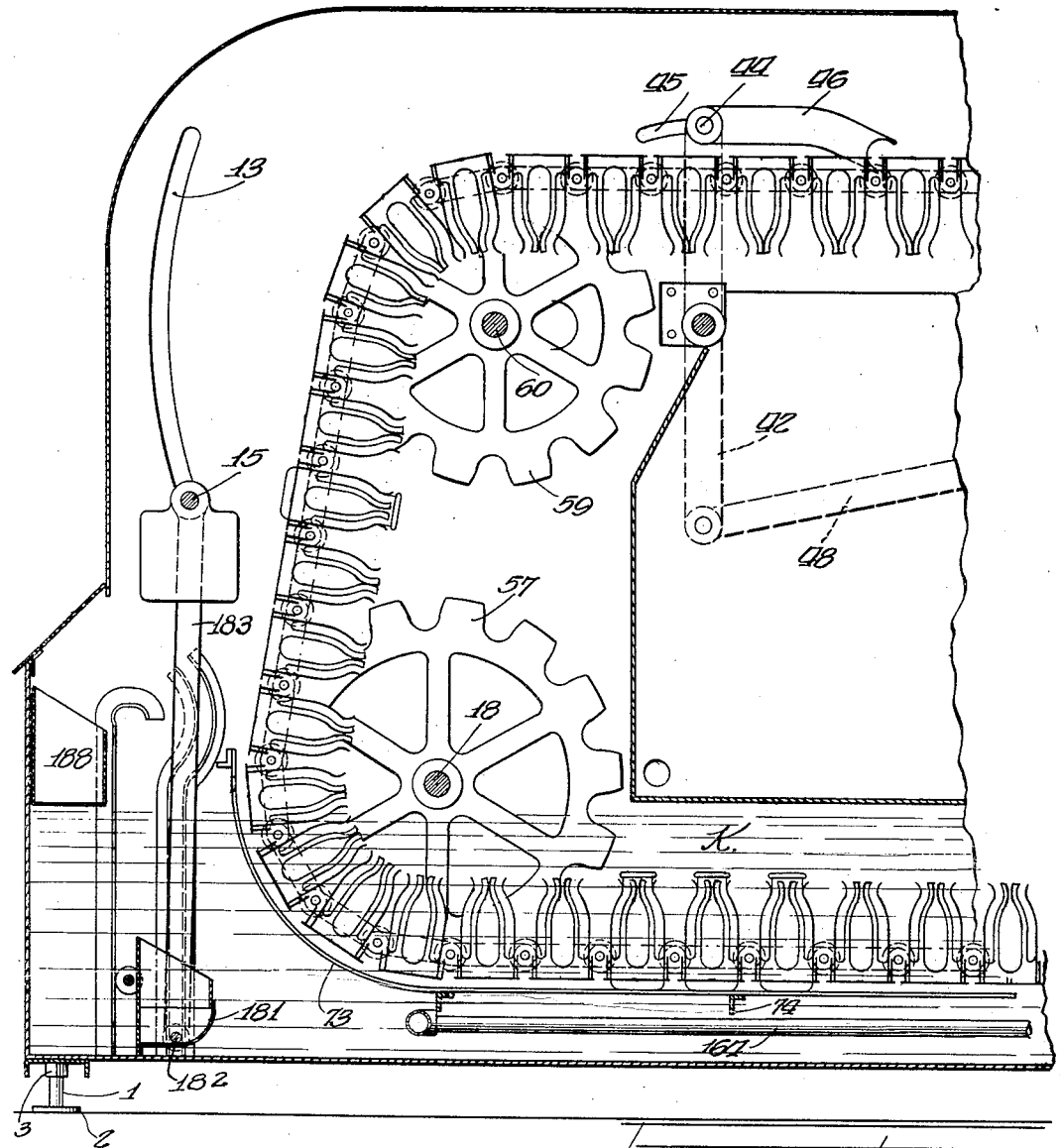

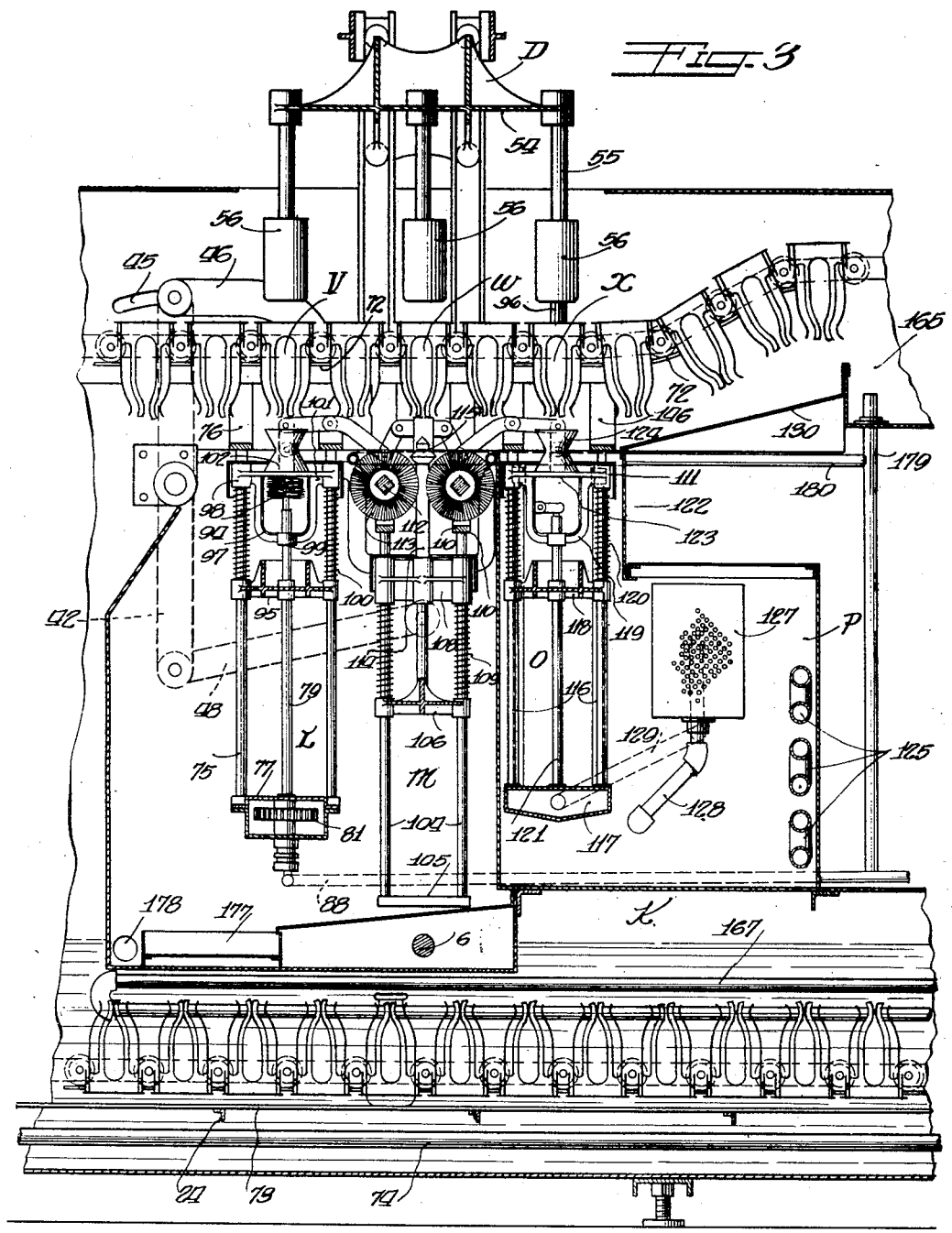

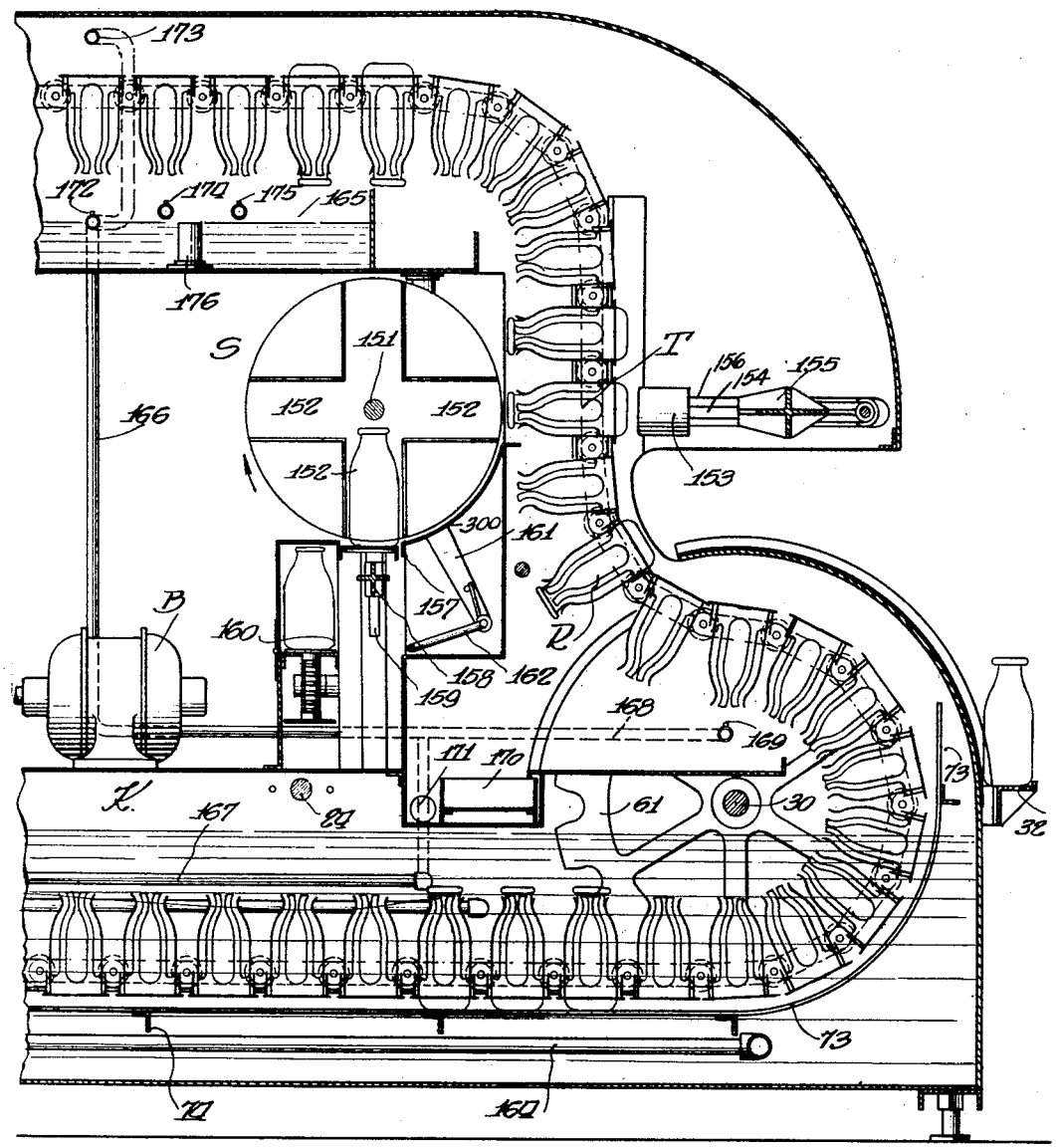

Nov. 7, 1933.   R. J. WYNNE ET AL   1,934,247
BOTTLE WASHING MACHINE
Filed June 5, 1931   12 Sheets-Sheet 7
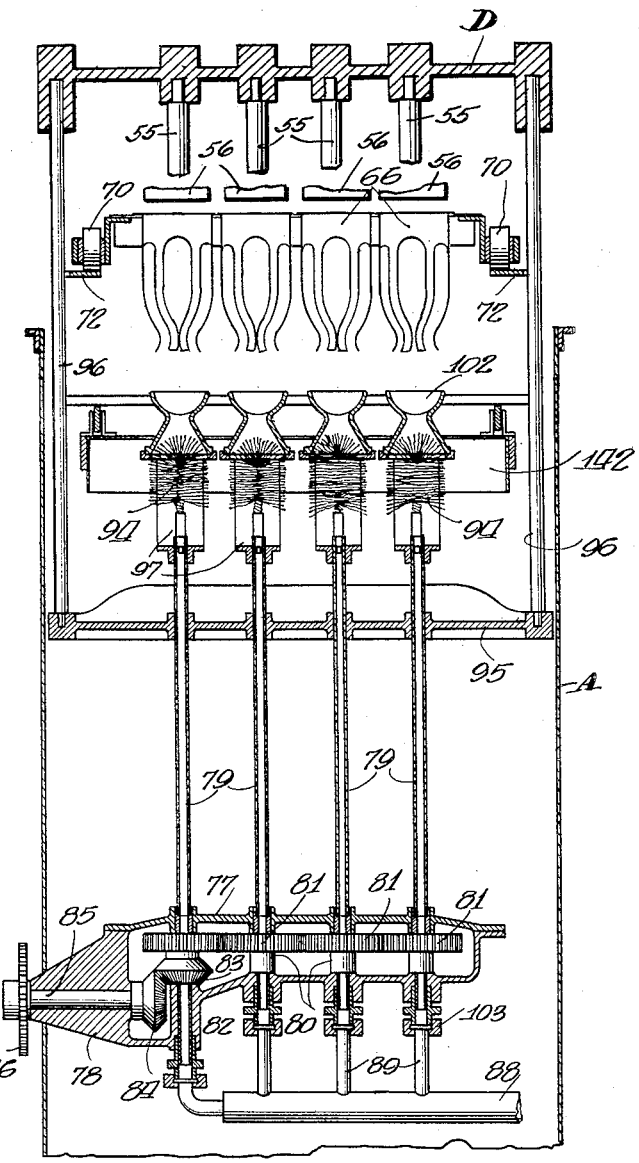
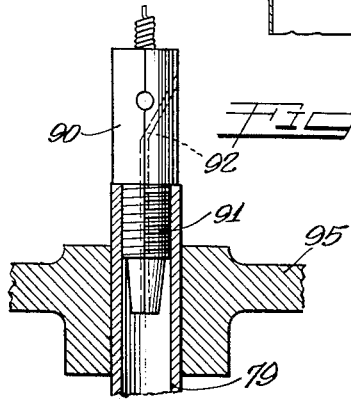
Inventors:
Robert J. Wynne
Paul H. Meyer

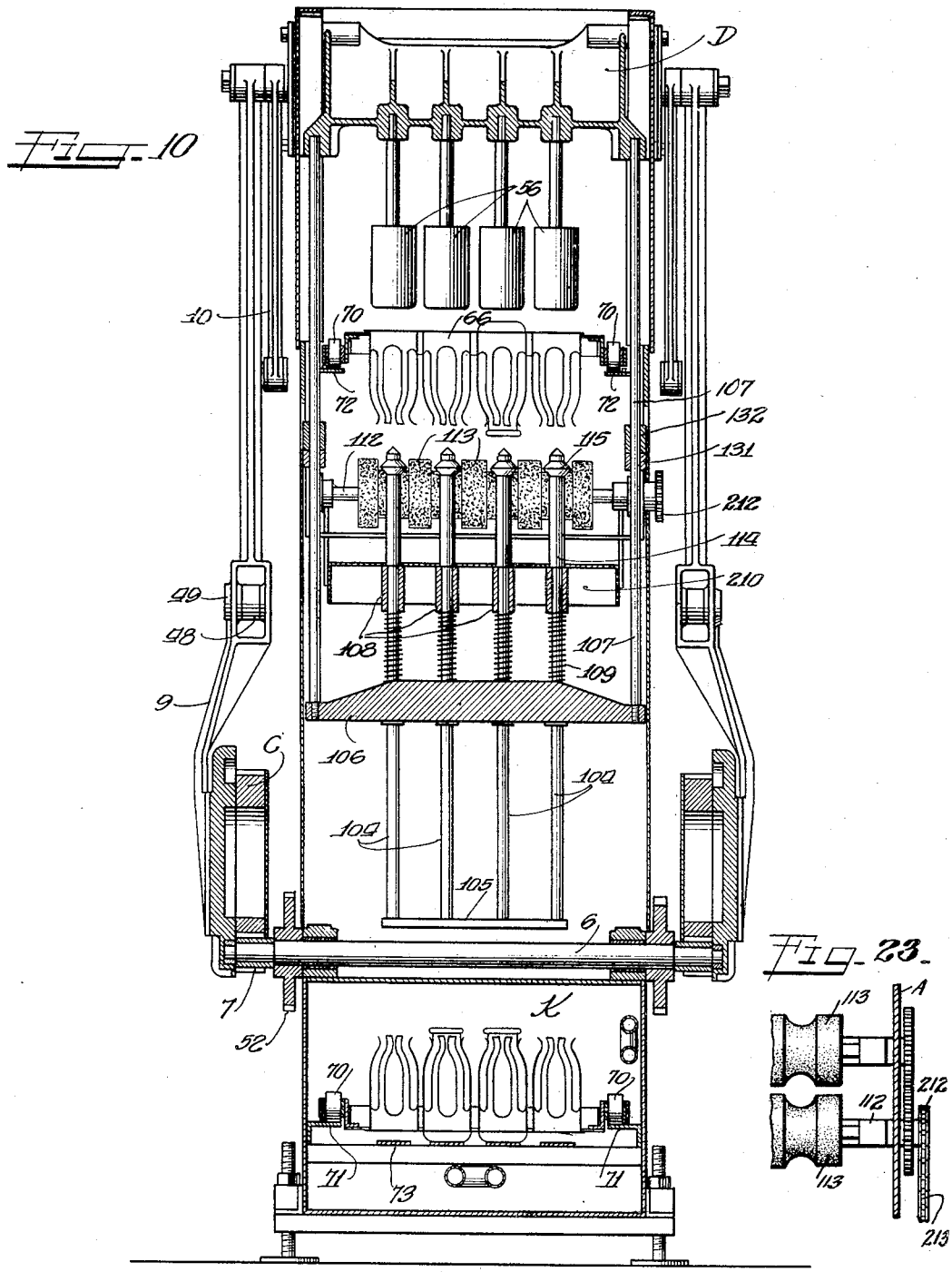

Nov. 7, 1933.  R. J. WYNNE ET AL  1,934,247
BOTTLE WASHING MACHINE
Filed June 5, 1931  12 Sheets-Sheet 9
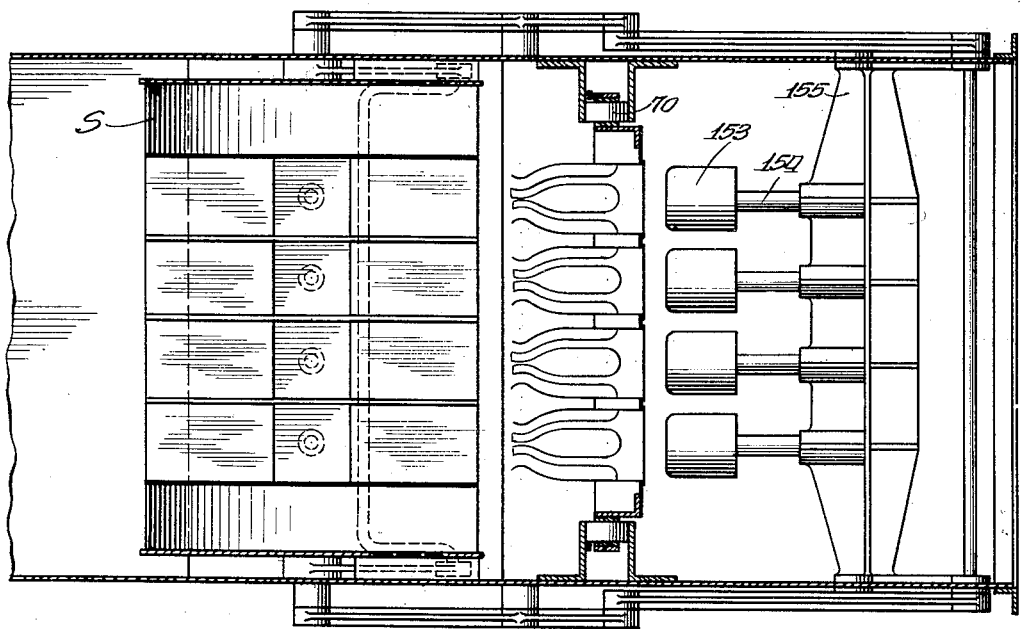
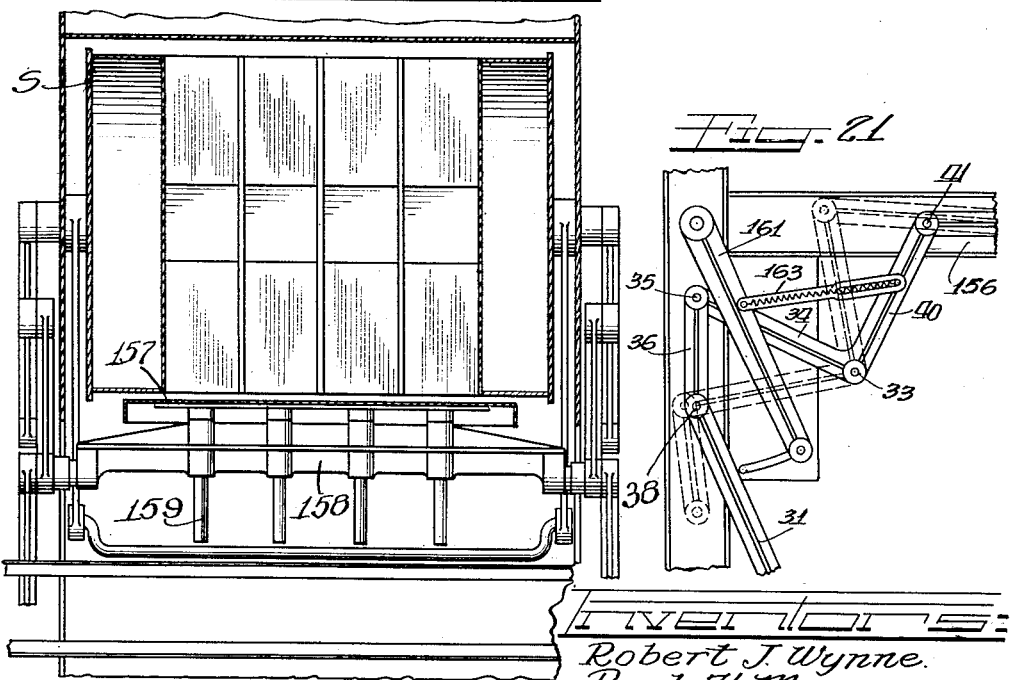

Nov. 7, 1933. R. J. WYNNE ET AL 1,934,247
BOTTLE WASHING MACHINE
Filed June 5, 1931  12 Sheets-Sheet 10
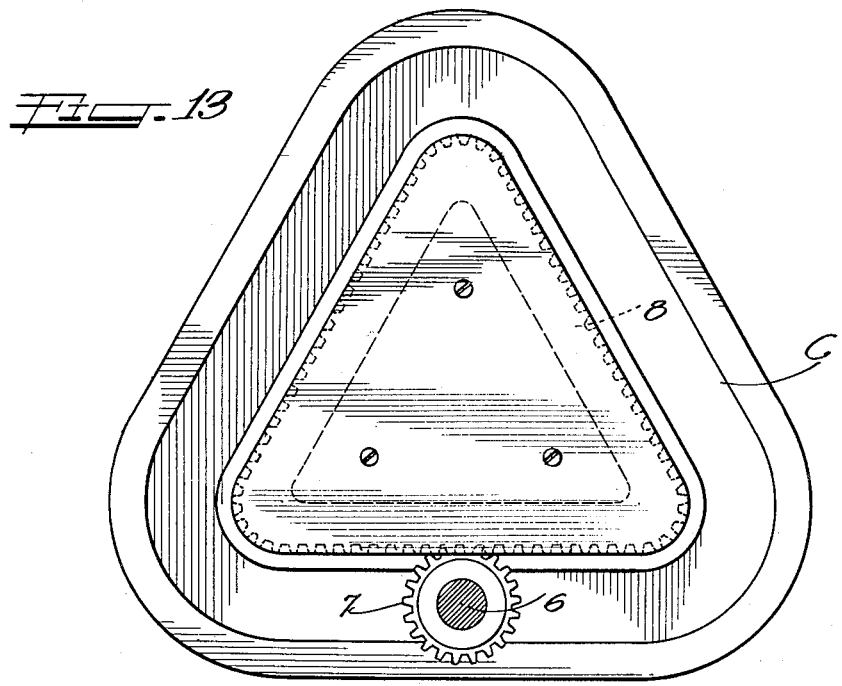
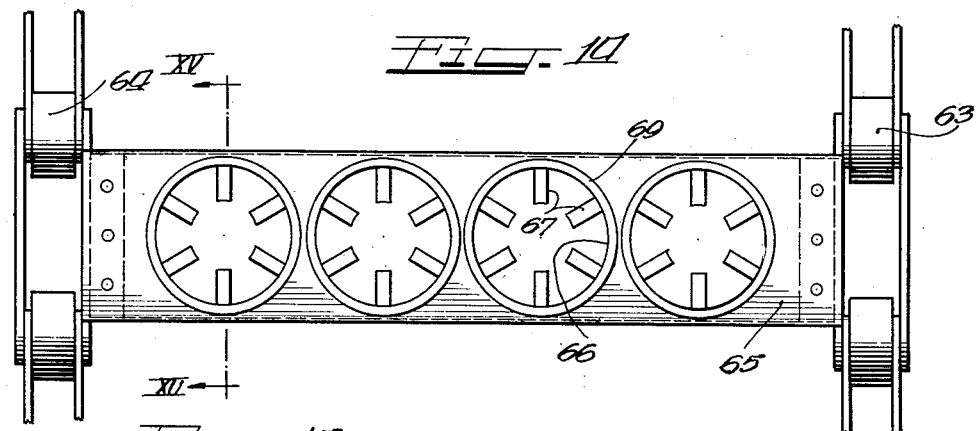
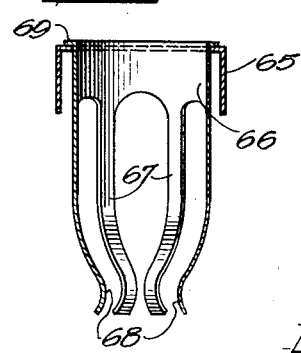
Inventors:
Robert J. Wynne.
Paul H. Meyer.

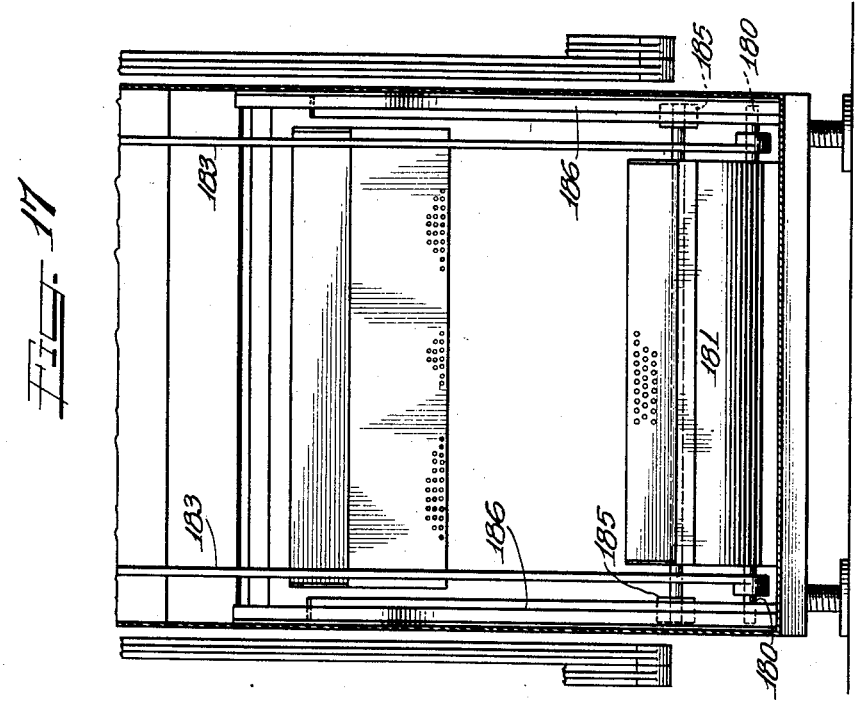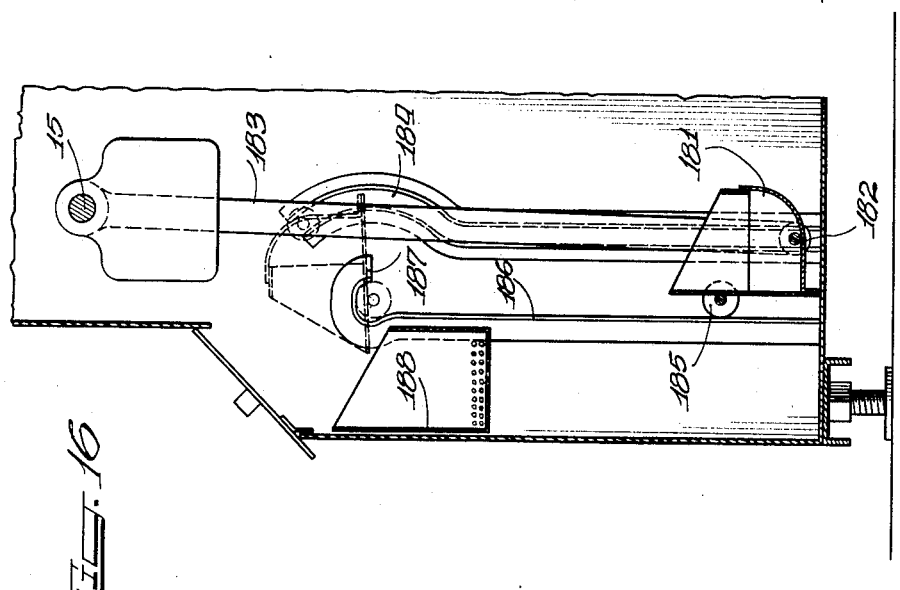

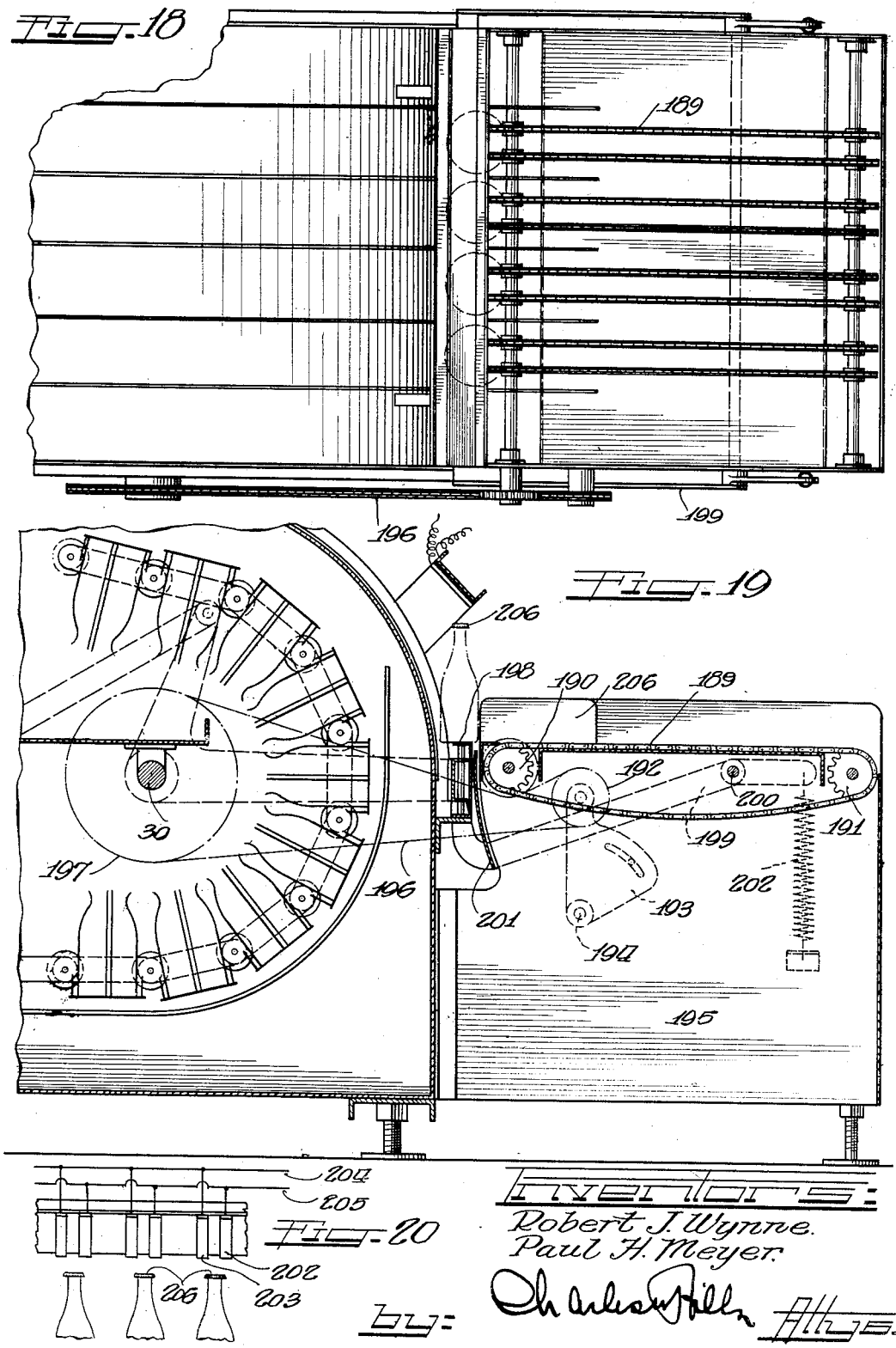

Patented Nov. 7, 1933

1,934,247

UNITED STATES PATENT OFFICE 1,934,247

BOTTLE WASHING MACHINE

Robert J. Wynne and Paul H. Meyer, Bellwood, Ill., assignors to Solar-Sturges Mfg. Co., Melrose Park, Ill., a corporation of Illinois Application June 5, 1931. Serial No. 542,239

9 Claims. (Cl. 15—61)

The present invention relates to a bottle washing machine and particularly to a machine which is useful in dairy and beverage plants for washing large quantities of bottles for reuse. The invention however is not limited to dairy or beverage use as it is susceptible of adaptation to washing bottles of any character and kind.

There are bottle washing machines in use at the present time for washing bottles in large quantities but the present machines are not completely satisfactory in that it is impossible to wash bottles of different sizes indiscriminately inserted in the machines and furthermore the present machines grip the bottles by the crowns for movement through the machines thus necessarily contaminating to some extent the crowns of the bottles even after sterilization in the machines. The present type of machines are adaptable for washing bottles of different sizes but in such event the machine must be adjusted to wash one size of bottles and then adjusted to receive a different size. In other words the present machines do not wash more than one size of bottle at a time and require adjustment to accommodate the machines to bottles of different sizes.

The machine of the present invention on the other hand will without adjustment wash bottles of different sizes and also convey the bottles through the machine by engagement of the body of the bottle leaving the crowns free and ejecting or unloading the bottles from the machine by pressure applied to the bottoms of the bottles.

An object of the present invention is to provide a bottle washing machine which will, without adjustment, wash bottles of different sizes.

Another object of the invention is to provide a bottle washing machine wherein brush washing means are provided and wherein the bottles are moved against the brush washing means for washing purposes.

Another object of the invention is to provide a bottle washing machine with means for tempering the bottles on entering the machine to prevent breakage of the bottles when introduced in the hot soaking bath.

A still further object of the invention is to provide a bottle washing machine wherein bottle carriers are provided having open ends so that a bottle may be pushed out either end of a carrier.

A still further object of the invention is to provide a bottle washing machine wherein the bottles are unloaded or ejected by pressure means applied to the bottoms of the bottles.

Another and still further object of the invention is to provide a bottle washing machine with washing and spraying steps carried out below the path of travel of the upper run of the bottle conveyor so that whatever dirt or cleaning fluid there may be will not fall onto any bottles which have heretofore been cleaned.

A yet further object of the invention is to provide a bottle washing machine with means for unloading bottles from the machine without any part thereof coming in contact with the crowns of the bottles after sterilization.

A still further object of the invention is to provide in a bottle washing machine of the type having a conveyor for moving bottles through the machine, with means for removing bottles from the conveyor and presenting such removed bottles to the brush washing and sterilizing steps.

Another and still further object of the invention is to provide in a bottle washing machine, means for stopping operation of the machine should a metal capped bottle be inadvertently fed to the machine.

A further object of the invention is to provide in a bottle washing machine, a soaking bath which may be periodically cleaned and replenished with caustic.

Another object of the invention is to provide, in a bottle washing machine, a separate spray solution which is separated from the soaking solution and rinse water so that the spray solution may be kept clean and thus available for reuse.

An important object of the invention is to provide linkage for actuating parts of the machine together with a novel gear drive for the linkage so that cams may be eliminated and wear of the moving parts reduced to a minimum.

A yet further object of the invention is to provide a bottle washing machine wherein rows of bottles are moved through the machine by an endless chain and during such movement some of the bottles are removed from the chain and presented to brush washing and spraying means, with individual means for the several bottles whereby bottles of different sizes may be brush washed and sprayed without having to adjust the machine to the different sizes of bottles.

A yet further object of the invention is to provide a loader for bottle washing machines wherein the bottles are loaded by pressure applied to the bottle bottoms.

Another and yet further object of the invention is to provide a bottle washing machine for continuous operation whereby quantity washing of bottles may be accomplished with minimum expense and with minimum expenditure of time involved in the washing operations.

Another and further object of the invention is to provide a bottle washing machine of the conveyor chain type adaptable for washing large quantities of bottles wherein the bottles are thoroughly washed and sterilized and removed from the machine without any part thereof coming in contact with the crowns of the bottles after sterilization.

The above, other, and further objects of the invention will be apparent from the following description, accompanying drawings, and appended claims.

Generally speaking the invention contemplates a bottle washing machine of the conveyor chain type wherein a conveyor chain is provided with a plurality of bottle carriers or spring cups which carriers or cups are open at both ends so that a bottle may be forced out of either end of the carrier and which carriers have spring fingers for normally retaining the bottles therein against accidental displacement.

The invention further contemplates means for bodily displacing the bottles from the conveyor chain and the carriers at a certain place in the travel of the chain through the machine for presentation of the bottles to brush washing and spraying means. Such means contemplating the complete removal of the bottles from the chains and carriers and supporting the bottles about and against brushes so that the insides and outsides of the same may be thoroughly washed by the brushes and then presenting the bottles for thorough sterilization by a spray against the insides and outsides of the same while removed from the chain. The bottles are thereupon returned to the conveyor chain for rinsing and unloading.

The invention contemplates further an unloading mechanism wherein the sterilized bottles are removed from the chain by pressure applied to the bottoms of the bottles.

The present invention will be illustrated and described in connection with an arrangement thereof suitable for washing milk bottles and it is to be understood however that the invention is not to be limited to the washing of milk bottles as the machine is readily adaptable for washing any kinds of bottles or like containers where occasion requires such a washing machine.

The accompanying drawings are as follows:

Figure 1 is a side elevational view of a bottle washing machine including the present invention and in this figure showing in general the linkage and the special gear for operating the linkage for actuating various parts of the machine.

Figure 2 is a fragmental vertical sectional view through the machine, showing the left hand end of the apparatus of Figure 1.

Figure 3 is a fragmental vertical section through the form of apparatus illustrated in Figure 1 and showing the central part of the same.

Figure 4 is a fragmental vertical sectional view through the right end of the machine as illustrated in Figure 1.

Figure 5 is a top plan view, with parts in section, of the brush washing and spraying portion of the apparatus.

Figure 6 is a fragmental side view, with parts in section, showing some of the details of the brush washing and spraying portion.

Figure 7 is a fragmental side elevational view, with parts in section, of the brush washing and spraying portion and illustrating bottles of different sizes in various stages of treatment by this portion of the machine.

Figure 8 is a vertical transverse sectional view showing details of the inside brush washing mechanism.

Figure 9 is an enlarged view, with parts in section, of the upper end of one of the spindles of the inside brush washing mechanism.

Figure 10 is a view similar to Figure 8 showing the outside brush washing mechanism.

Figure 11 is a fragmental horizontal sectional view taken through the right hand end of the machine as illustrated in Figure 1 and showing in plan the parts of the bottle unloading or ejecting mechanism.

Figure 12 is a vertical axial section through the receiver of the bottle unloading mechanism.

Figure 13 is an elevational view of the special gear for actuating various parts of the machine showing in dotted lines the gear teeth with a pinion in mesh with the special gear.

Figure 14 is a top plan view of a bottle carrier or spring cup supporting member showing the same attached to the conveyor chain.

Figure 15 is a vertical sectional view through the spring cup or bottle carrier of the present invention.

Figure 16 is a fragmental vertical sectional view of the left hand end of the machine as illustrated in Figure 1 and showing details of construction and operation of the bucket used for clarifying and replenishing the soaking bath.

Figure 17 is a fragmental vertical transverse section showing the front elevation of the bucket of Figure 16.

Figure 18 is a fragmental top plan view of a loading table applied at the loading end of the washing machine.

Figure 19 is a vertical sectional view through the loading table of Figure 18.

Figure 20 is a schematic view of automatic motor cut out means for use when metal capped bottles are inadvertently fed to the washing machine of the present invention.

Figure 21 is a schematic drawing illustrating the lost motion connection between the unloading pusher bellcrank and the bottle kickoff for delivering the bottle to a belt for withdrawal from the machine.

Figure 22 is an enlarged fragmental sectional view, taken substantially in the plane of line 22—22 of Fig. 7.

Figure 23 is a fragmental plan view showing the inter gearing of the outside brush.

The invention has been illustrated in connection with a machine for washing milk bottles but is not limited to milk bottle washing as it is of course adaptable for washing any kinds of bottles, therefore the invention is not to be limited to milk bottle washing apparatus.

The drawings will now be explained.

The illustrated form of the invention comprises a casing A within which the conveying and washing and other mechanism is enclosed. The casing is supported on the floor by means of threaded upstanding bolts 1 having the lower ends headed in feet 2 which bolts extend through bracket 3 suitably secured to the casing A. Nuts 4 and 5 vertically position the casing A on the bolts 1 so as to level the washing machine on the floor.

A motor B is mounted in the casing A for driving the apparatus and also for actuating a pressure pump.

The apparatus is of the type employing an endless conveyor chain, intermittently actuated, which chain carries a plurality of bottle carriers or cups.

A shaft 6 is transversely supported in the casing and is provided with a pinion 7 which is herein referred to as the driving pinion.

A triangular shaped gear C has a gear track which is triangular in elevation designated at 8 in Figure 13. The gear track 8 will hereinafter sometimes be referred to also as a rack.

A driving link 9 is fastened at one end to the triangular or special gear C and at its upper end to a crosshead D.

There are utilized similar linkage members on each side of the machine similar in construction and operation consequently the description of the linkage on one side of the machine it is believed, will suffice for both.

A link 10 is pivoted at its upper end to the crosshead D and at its lower end at 11 to another link 12. The other end of the link 12 is guided in a slot 13 formed in the casing herein referred to as the left end of the casing looking at the machine as illustrated in Figures 1, 2, 3, and 4. A link 14 has one end pivoted at 15 to the lever 12 and its other end pivoted at 16 to an arm 17 of a bellcrank E. The bellcrank E rocks about a shaft 18 suitably secured in the machine. The other arm 19 of the bellcrank E is pivoted at 20 to one end of a long link 21 the other end of which link is pivoted at 22 to an arm 23 of bellcrank F. The bellcrank F rocks on a shaft 24 suitably secured in the machine. The other arm 25 of the bellcrank is pivoted at 26 to one end of a link 27 the other end of which link is pivoted at 28 to an arm 29 of a bellcrank G. The bellcrank G rocks on a shaft 30 extending transversely of the machine at the right hand or front end of the same. The arm 31 of the bellcrank G, sometimes referred to herein as the loader arm, extends a slight distance beyond the front end of the machine to afford a seat 32 for receiving bottles and moving the same into engagement with the carriers on the conveyor chain. The bellcrank G is herein sometimes referred to as the loader.

A bellcrank H rocks about a stud 33 above the loader. One arm 34 of the bellcrank H is pivoted at 35 to one end of a slide member 36 which is guided for vertical reciprocation in the machine structure. A link 37 is pivoted at one end at 38 to the slide member 36 and at its other end is pivoted at 39 to the arm 25 of the bellcrank F between its stud 24 and the pivotal connection 26 with the link 27. The other arm 40 of the bellcrank H is pivoted at 41 to a slide for the unloader which will hereinafter be explained.

A link 42 is pivoted intermediate its ends at 43 to the link 12. At its upper end a pin 44 extends transversely of the casing A through a slot 45 formed in the casing. The pin 44 is inwardly of the casing provided with pawls 46 for imparting step by step or intermittent motion to the conveyor chain. The lower end of the link 42 is pivoted at 47 to a link 48 the other end of which is pivoted at 49 to the driving link 9 intermediate its ends.

A reduction gearing of any known suitable type is associated with the motor B and has as a part thereof a sprocket 50 for driving a sprocket chain 51 secured to the drive shaft 6 for rotating the same. Sprocket chain 51 engages a sprocket wheel 52 on the shaft 6.

The crosshead D is guided in guide members 53 formed as a part of the washing machine.

The crosshead D is provided with a yoke 54 which in the present instance is provided with a plurality of depending rods 55 carrying at the lower ends thereof pusher blocks 56.

Figures 2, 3, and 4 illustrate an embodiment of the invention as arranged for washing milk bottles.

Lower rear sprocket wheels 57 are mounted on a shaft 18 suitably supported in the apparatus. These sprocket wheels are disposed at the lower rear end of the machine.

Upper rear sprockets 59 are supported on a shaft 60 near the upper rear part of the machine.

Front lower sprockets 61 are carried on a shaft 30 disposed near the lower front end of the machine while upper front guide plates, not shown, are provided for supporting and guiding the conveyor chain.

The conveyor as a matter of fact comprises two chains 63 and 64 (portions of which are illustrated in Figure 14) which chains are cross connected at intervals in the length thereof by plates or bridge members 65 which in turn are provided with a plurality of bottle carriers or spring cups, four cups or carriers being illustrated.

The conveyor consequently comprises two chains 63 and 64 at each side of the machine connected at intervals in the length of these chains by the members 65 which constitute bridges thus cooperating with the chains to form a complete bottle conveyor element.

The bridge members 65 are preferably formed as channels as may be observed in Figure 15.

The bottle carriers or spring cups of the present invention consist of open ended carriers which have a cylindrical body portion 66 and a plurality of spring fingers 67 extending from one margin thereof. The ends of the fingers 67 are bent towards one another, or converge to form bottle gripping portions 68 for engaging the necks of the bottles as will be more fully hereinafter explained. The opposite margins of the carriers or spring cups are formed with outturned flanges 69 which are fastened to the bridge members 65. The bodies 66 of these bottle carriers are cylindrical and in diameter slightly in excess of the diameter of the maximum sized bottle the machine is designed to receive. Figure 14 illustrates four of these carriers on bridge members 65, that is the conveyor as illustrated is designed to carry rows of bottles with four bottles in a row.

It is to be understood however that the capacity of the machine may be varied so that the bridge members may carry more than four bottles or less if desired.

The conveyor is provided at intervals in its length with rollers 70 which are suitably secured on stub axles fastened to the chains comprising the conveyor. These rollers in the lower run of the conveyor travel on tracks 71 arranged alongside the conveyor on each side of the machine and in the upper run thereof on tracks 72 arranged on each side of the machine within the casing A, and rigidly supported over the washing and sterilizing portions of the apparatus. The upper tracks 72 guide the conveyor upwardly in its top run near the middle of the machine and downwardly onto the lower front sprocket wheels 61 thus doing away with the necessity for sprocket wheels at the upper front portion of the machine.

It is understood that in the bottom run of the conveyor the bottle carriers are upright that is with the spring fingers 67 extending upwardly and in the top run the carriers are inverted that is with the fingers 67 extending downwardly.

In the lower portion of the machine and including the lower run of the conveyor is a soaking bath tank K. This tank is shown as extending from end to end of the machine but of course it might be made as a series of compartments separated one from another so that the temperatures and consistency of the soaking solution in the various tanks might be varied if so desired.

A series of flat metal strips 73 are secured by angle members 74 in the tanks and underlie the paths of movement of the bottle carriers of the conveyor. These strips are provided so that the bottoms of the bottles may rest on the same as the bottles are being moved through the soaking bath and to prevent dislodgment of the bottles should some of the bottles be smaller than the carriers.

Strips 73 are curved upwardly at each end to conform to the paths of movement of the conveyor through the soaking tanks.

Figure 3 illustrates mechanism for displacing bottles from the conveyor and washing the insides and outsides of the bottles while so displaced.

There are illustrated in Figure 3 means for washing the insides of the bottles, means for washing the outsides of the bottles and means for spraying or sterilizing the bottles.

The inside bottle washing mechanism herein designated as the inside washing unit L consists of a plurality of pairs of crosshead guide rods 75 which depend from strips 76 suitably secured in the frame structure of the machine. Inasmuch as there are four bottle carriers illustrated in the present drawings there will be provided four inside bottle washing units L. A description therefore of one will suffice for all.

The lower ends of the rods 75 are fastened in a casing 77 supported on a casting 78 suitably secured in the machine. A spindle 79 is disposed between every pair of rods 75. The spindles are hollow and at the lower ends register with hollow hubs 80 of gears 81 which gears are intermeshed so that all of the spindles 79 may be rotated. The hub of one of the gears such for instance as the hub 82 is provided with a bevel gear 83 in mesh with a bevel gear 84 on stub shaft 85 supported in the casting 78. A sprocket wheel 86 is carried on the outer end of the shaft 85 being driven by a sprocket chain 87 from the shaft 6.

A liquid supply pipe 88 has branches 89 communicating with the various spindles 79 for supplying washing water or other washing fluid to the spindles.

The upper ends of the spindles 79 are closed by plugs 90 which have threaded portions 91 for engaging the upper ends of the spindles (Fig. 9). The plugs are provided with bores 92 discharging at the sides of the plugs so that fluid within the spindles 79 may be discharged outwardly for cleansing purposes. Brushes 94 are secured to the plugs 90 to wash the insides of bottles which are moved over these brushes in a manner to be hereinafter described. The spindles 79 and the attached brushes are fixed against axial movement.

A crosshead 95 is vertically slidable on the various pairs of rods 75 the crosshead 95 being connected by rods 96 to the crosshead D.

On every pair of rods 75 a yoke 97 is slidable. The yoke is illustrated as U-shaped with the upper ends having enlarged portions 98 for encircling the rods 75. The central portion of the yoke is enlarged to provide a bearing 99 for the spindles 79. Springs 100 encircle the rods 75 between the crosshead 95 and the ends 98 of the yoke 97 and tend to maintain a yoke at its upward limit of travel. A yoke 97 is movable vertically relatively to the crosshead 95.

The bellcrank E is pivoted on the shaft 18, the bellcrank F on the shaft 24, bellcrank G on the shaft 30, and the bellcrank H pivots on the stub shafts 33.

The linkage and various other instrumentalities having to do with the actuation of the washing machine are in position immediately preceding the advancement of the conveyor one step in its intermittent travel as imparted thereto by the swinging levers or links 42.

As the driving links 9 swing to the left as viewed in Figure 1 the links 42 will pivot about its pivotal connection 43 with the levers 12 thus moving the upper ends to the right. Such movement therefore moves the pawls 46 into engagement with rollers 70 on the conveyor to advance the conveyor one step. Movement of the triangular gear C about the lower right hand corner thereof causes the gear to next travel downwardly and to the right with the right leg of its rack in engagement with the driving pinion 7 whereupon the links 42, that is the upper ends thereof, start to move to the left, the levers 12 start upwardly thus rocking the bellcranks E, F, and G to raise the loader arm 31 and thus move the bottles that are on the shelf 32 along the arcuate path described by such shelf so that the bottles are thereupon delivered into the bottle carriers in the position R of Figure 4. Such movement as just described will also actuate the bellcrank H to move the crosshead 155 of the unloader mechanism to the left to eject from the bottle carriers in the position T the bottles therein contained and move the same into the adjacent horizontally disposed pocket 152 of the bottle receiver S. Such movement also causes the platform 157 to lower carrying with it the bottles which are in the lower compartment 152 and when this platform has been lowered to register with the endless belt 160 the kicker arms 161 are actuated to kick the bottles from the platform 157 onto the endless belt 160 whereupon the bottles are carried laterally outwardly of the machine.

Referring to the washing and spraying operations as illustrated in Figure 3 the moment the crosshead D starts downwardly the pusher blocks 56 move downwardly engaging the bottoms of the bottles in the three positions V, W, and X displacing the bottles contained in the carriers in these positions out of the conveyor and moving the same downwardly. Downward movement of the bottles from the carriers in position V moves the crowns of the same against the centering members 102 in the position V and thereafter moves downwardly the bottle, the centering member 102 and the yoke 97 thus pushing the bottles over the brushes 94. The spindles 79 carrying these brushes are rotated as soon as the motor B is placed in operation and the washing water is forced upwardly through the spindles 79 and discharged through the brushes to wash the interiors of the bottles on these brushes.

The bottles in position W are displaced from the conveyor and moved downwardly with the crowns of the bottles against the plugs 115 on the spindles 114 whereupon continuous movement downwardly moves the yoke 108 downwardly against the action of the springs 109 so that the bottles are thus pushed between the brushes 113 for washing the outsides of the bottles.

A crosshead 118 is slidable on rods 219 which are supported by the straps 146. Every pair of rods 219 carries a yoke 119 slidable vertically.

Springs 120 surrounding the rods 219 are interposed between the crosshead 118 and a yoke 119.

Extending upwardly from the tank 117 between the rods 219 of a pair is a pipe 121 communicating with the interior of the tank 117. The upper end of the pipe 121 is open and is normally closed by a weighted cap 122 carried by its yoke 119. The purpose of the cap 122 is to prevent the pipe 121 from clogging and also for spreading the liquid discharged from the pipe for spraying or sterilizing purposes as will hereinafter be explained.

There is a yoke 119 for every pair of rods 219. The yokes 119 are spring actuated by means of the springs 120 and constitute individually supported and movable abutments for cooperating with the bottle necks as the bottles are dislodged from the conveyor by the plungers 56. The yokes 97 of the interior bottle washing portion or station likewise constitute individually movable and supported abutments cooperating with the plunger 56 in the position V.

The tubes 116 communicate with the interior of the tank 117 for receiving liquid supply therefrom and these tubes are, at the upper ends provided with openings 207 through which the sterilizing fluid is discharged against the exterior of the bottles in the position X for spraying and sterilizing purposes.

Every yoke 119 supports across its top a bar 123 and the bar 123 in turn carries a centering member 124 like the centering members 102 of the inside washing units.

Pusher blocks 56 for the spraying or sterilizing units are disposed on the crosshead D to register with the centering members 124 of this unit.

The spraying or sterilizing unit O is encased in a chamber P wherein is maintained a spraying or sterilizing solution preferably a strong caustic solution. This solution is maintained in a heated condition by heating pipes 125 disposed within the chamber P. A pressure pump 126 is driven by the motor B and creates pressure within the tank 117 for forcing liquid upwardly through the tubes 116 and the pipes 121 for spraying purposes. A strainer 127 is arranged within the chamber P. The liquid within the chamber P enters the strainer 127 whence it is drawn by the pipe 128 to the pump 126 thence is directed through pipe 129 to the tank 117 where because of the pressure created in the pump the liquid is forced upwardly within the tubes 116 and the pipes 121 for spraying purposes.

A drain board 130 is disposed underneath the upper run of the conveyor where the same is directed uphill as observed in Figure 3 and extends some distance from the spraying unit O in the direction of travel of the upper run of the conveyor. The conveyor is caused to go uphill at this point so that any liquid there may be in or on the bottles after leaving the spraying unit O may drain by gravity from such bottles thence fall on the drain board 130 and be returned to the chamber P for reuse. It is to be observed that the spraying or sterilizing solution within the chamber P is not contaminated by any foreign matter as no foreign matter can reach this chamber because of the fact that the inside and outside cleansing units L and M have removed from the bottles all such foreign matter. Should however it so happen that some bristles remain in the bottles such bristles are removed in the spraying unit and naturally would fall to the bottom of the chamber P but would not be disadvantageous for reuse of the sterilizing solution.

On the rods 107 which connect the crosshead 106 of the outside washing unit M with the crosshead D are pinned collars 131. Disposed on the rods 107 above the collars 131 are sleeves 132 each of which has outstanding ears 133 and 135 on opposite sides of the sleeves. A link 134 is pivoted to one end of the extension 133 and at its other end is pivoted at 136 to a rocker bar 137 which is pivoted at 138 to the straps 76 supporting the rods 75 of the outside washing unit L. The other end of the rocker bar 137 is pivoted at 139 to a link 140 the other end of which is pivoted to an ear 141 secured to a cover plate member 142 which overlies the yoke 97 of the washing unit L.

Similarly a link 143 is pivoted to the extension 134 of the sleeve 132 and at its other end is pivoted to a rocking bar 144 which is pivoted at 145 to the straps 146 supporting the rods 219 of the spraying unit O.

The rocker bars 144 are connected by links 147 to a cover member 148 overlying the yokes 119 of the spraying unit O. The cover members 142 and 148 are provided with central apertures 149 and 150 respectively to admit passage therethrough of a bottle supported between the centering members 124 and the pusher blocks.

Figure 6 illustrates in dotted lines the positions of the levers and arms just described when the crosshead D is at its upper position of travel. In this position the cover members 142 and 148 respectively lie below the brackets 76 and 146 respectively and consequently the yokes, carrying the centering members 102 and 124 respectively are lowered so as to allow passage of bottles suspended within the bottle carriers of the conveyor during the time that the crosshead D is raised and the conveyor is advanced in its intermittent motion.

*Loader*

The loader as before stated consists of the bellcrank G and its associated arm 31 and bottle supports 32. As the bellcrank G is moved in counterclockwise direction as observed in Figure 1 by the linkage in a manner to be hereinafter described bottles placed on the shelf 32 are raised upwardly and carried along and pushed into bottle carriers in the position R of Figure 4 which is the receiving position. It will be observed that the carriers in this position are inclined downwardly so that bottles delivered thereto will be moved into the carriers for movement through the machine.

*Unloader*

The unloader of the present invention comprises a receiver shown in the present instance as a rotatable casing S (Figure 4) which is arranged for clockwise rotation about a shaft 151. The receiver S is provided with a plurality of pockets 152 disposed in the present instance at 90° apart. The receiver is given intermittent rotary motion in clockwise direction by the linkage as hereinafter described.

A plurality of horizontally disposed pusher blocks 153 are carried on stub extensions 154 of a horizontally movable crosshead 155. The crosshead is guided in slots 156 formed in the sides of the casing A and is actuated by the arms 40 of the bellcrank H. The pockets or compartments 152 of the receiver S are transversely partitioned to form pockets for receiving bottles ejected from the conveyor by the pusher blocks 153.

The receiver S is given motion of rotation of 90° as the conveyor is moved one step by its driving mechanism.

The receiver S receives bottles discharged horizontally from the bottle carriers in position T, the bottles being pushed into the contiguous pockets of the receiver. The pusher blocks 153 act against the bottoms of the bottles pushing the same out of the bottle carriers so that the tops of the bottles are adjacent the shaft 151. When the receiver S is given rotative movement of one step the bottles are then deposited on a platform 157 underlying the open end of the lower pocket when in vertical position. A plate 300 is disposed adjacent the receiver S for engagement by the bottoms of the bottles in the various pockets 152 as the receiver is moved in clockwise direction after having received a row of bottles from the conveyor at the discharge position, and where the bottles are moved to upright position as shown in Fig. 4. The platform 157 is carried on a crosshead 158 guided for vertical movement. Rods 159 mounted in the crosshead 158 support the platform 157. The crosshead 158 is connected by the pivots 38 of the linkage and is lowered during the time the chain or conveyor is at rest. The platform 157 is lowered to register with an endless belt 160 which is illustrated as discharging outwardly of the side of the casing A for receiving from the platform 157 the bottles discharged thereon from the receiver S. The bottles are kicked from the platform 157 onto the belt 160 by a kicker mechanism including arms 161 which are freely mounted on the ends of the shaft 151 and which at the lower ends are connected by a member 162 constituting a foot. The arms 161 are given movement in clockwise direction to kick the bottles onto the belt 160 by means of a link 163 which at one end is connected to the arms 161 and at its other end has an enlarged portion with a slot therein through which projects a pin on the arms 40 of the bellcrank H thus constituting a lost motion connection between the arms 161 and the bellcrank H. As the pusher blocks 153 of the unloader are moved to the left as viewed in Figures 1 and 4 of the drawings the arms 40 of the bellcrank H will move through the slots of the arm or link 163 and on completion of the movement of the ejector crosshead will cause the arms 161 to swing in clockwise direction thus kicking off the bottles on the platform 157 onto the belt 160. Continued movement of the linkage raises the platform 157 into the position shown in Figure 4 for receiving another lot of bottles from the receiver S.

The soaking tank K is provided with heating coils 164 connected with a suitable source of heat for maintaining the soaking bath at any desired temperature.

Underlying the upper run of the conveyor near the front end of the machine is a rinsing tank 165 into which drips rinsing water. The water within the tank 165 is warm water being supplied thereto through a pipe 166 which is connected to a pipe coil 167 within the soaking bath, the soaking bath therefore heating the rinsing water of the tank 165. The pipe 166 has an extension 168 with nozzles 169 disposed near the front end of the machine and lying below the conveyor immediately below the loading portion so that water discharged from the nozzles 169 will shoot upwardly, prerinsing the bottles and removing therefrom any straws, caps, dirt or the like that there may be in the bottles. The action of the water discharged from the nozzles 169 serves to temper the bottles so that the same will not be cold when introduced into the hot soaking bath thus preventing breakage of the bottles. Therefore there is provided at the entering end of the machine a prerinsing and tempering means.

A screen member 170 is disposed underneath the bottles delivered to the carriers in the position R in the loading end to receive therein any foreign matter there may be in the bottles and which is discharged at the time the same are inserted in the bottle carriers. This screen may be readily removed for disposing of the contained refuse. Furthermore a drain outlet 171 is provided in the event any liquid accumulates near the screen member 170 and also to allow removal of any liquid there may be dripping from the bottles between the rinsing tank 165 and the unloading position.

The pipe 166 is provided with discharge nozzles 172 arranged to discharge rinsing water upwardly against the insides of the bottles suspended in inverted position in the conveyor and also upper nozzles 173 which discharge rinsing water downwardly on the outsides and bottoms of the bottles for completely rinsing the same. Cold water nozzles 174 and 175 are provided for directing cold water against the bottles as a final rinsing operation and also as a means to reduce the temperature of the bottles prior to being unloaded. The head of rinsing liquid within the tank 165 is regulated by an overflow pipe 176.

Underneath the inside washing unit L is disposed a screen 177 and a drain 178 so that any accumulated foreign matter or liquid may be withdrawn from the machine. The screen 177 may be removed as desired.

The liquid supply pipe 88 for the inside washing unit is supplied with liquid from the rinsing tank 165 through a pipe 179. A pipe 180 communicates with the pipe 179 and is arranged to discharge warm water onto the outside washing brushes 113 of the outside washing unit M.

It may be observed that the final rinsing water is utilized for bottle washing purposes. This water is warm having been heated in the manner heretofore described.

As before stated the strong caustic sterilizing solution within the chamber P is separated from the soaking bath and also from the rinsing water so as to prolong the life of the caustic in this solution and to keep it clean for reuse.

The soaking bath within the tank K is replenished from time to time with caustic and also is cleaned periodically.

A bucket 181 is carried by pivots 182 on links 183 disposed inwardly of the sides of the casing A which links are connected at the upper ends to the pivots 15 of the linkage mechanism heretofore described. The bucket 181 extends substantially the width of the tank K at the inner or left hand end of the tank and is guided in guideways 184. The bucket is provided with rear rollers 185 which engage a guide track 186 which at its upper end has a curved portion 187 which serves as a hook for the rollers 185 when the bucket reaches its upper end of travel whereby continued movement by the links 183 will cause the bucket to overturn and discharge the contents thereof into a strainer basket 188. Every time the bucket 181 is raised it carries with it a bucket full of the soaking bath solution and also carrying with it any scum or floating material such as corks, caps, straws and other foreign matter that there may be floating on the surface of the bath. In this manner the bath is periodically cleaned. There may be deposited in the strainer basket 188 a quantity of powdered alkali so every time a bucket full of solution is discharged into the basket it will carry with it on its return to the bath some of the powdered alkali thus replenishing and maintaining the strength of the soaking bath solution. The bucket 181 is operated periodically every time intermittent motion is imparted to the conveyor.

Figures 18 and 19 illustrate a loading table which may be employed in connection with a bottle washing machine of the present invention. As there illustrated the table is provided with a plurality of endless chains 189 traveling over sprockets 190 and 191. Idler pulleys 192 are carried on adjusting members 193 pivoted at 194 to the sides 195 of the loading table. Sprocket chains 196 engage the pulleys 192 and also the sprockets 190 and pass over sprocket wheels 197 fixed on the shaft 30 of the front sprocket wheels of the conveyor drive so that every time the conveyor is given a movement the chains 189 of the loader will be given a movement to the left as viewed in Figures 18 and 19 pushing a row of bottles onto the shelf 198 of the arm 31 of the loader mechanism.

Levers 199 are pivoted at 200 to the sides 195 of the loader frame intermediate the ends of the levers. The front ends of the levers are provided with a curved end plate 201 and the other ends of the levers have attached thereto springs 202 for normally pulling down the rear ends of these levers to raise the plate 201. The springs 202 become effective to raise the levers 199 and thus the plate 201 whenever the loader mechanism is moved in counterclockwise direction to deliver bottles to the loading position of the conveyor the plate 201 thus serving as a front stop against which bottles are moved at the next intermittent motion of the chains 189. Such movement of the chains 189 presents a row of bottles at the front edge of the loader table ready to be moved onto the shelf 198 of the loader arms with the next movement of the chains 189. It is therefore necessary for the attendant to supply bottles to the loader table and these are aligned and fed automatically to the loading mechanism as the washing machine is operated.

It sometimes happens that through inadvertence bottles are put on loading tables for washing purposes without having the caps removed. Where these bottles are milk bottles with paper caps then these may be readily removed when the bottles are pushed over the inside washing brushes but should perchance a metal capped bottle be placed on the loading table and allowed to enter the machine it would cause damage in the washing units. To obviate the loading of a metal capped bottle in the conveyor there are provided a plurality of electric contact fingers 202, 203 in pairs there being as many pairs as there are bottles in the row to be fed to the machine. Figure 20 illustrates this arrangement schematically. The contacts 202 and 203 are connected to conductors 204 and 205 which in turn are so associated with the motor circuit as to stop the motor circuit in the event a metal capped bottle is raised by the loading mechanism to bring the metal cap 206 thereof against a pair of the contacts 202 and 203, the metal cap in such instance closing the circuit between these members and stopping the motor from driving the machine. The operator may then remove such bottle before the same enters the machine and thus prevent damage.

The loading table may be provided with a plurality of partitions 206 to receive bottles in sidewise spaced relation for proper delivery to the loader of the washing machine.

Nozzles 207 (Figure 6) are provided in the upper ends of the tubes 116 for discharging spray or sterilizing solution against the bottles in the spraying or sterilizing unit O.

The cover members 142 and 148 of the inner washing units L and spraying units O respectively have connected thereto downwardly extending arms 208 and 209 respectively the lower ends of which are connected to a similar member 210 of the outside washing units M. The cover member 210 is normally disposed below the members 142 and 148.

The upper ends of the rods 104 of the outside washing units M are carried by straps 211.

The brushes 113 of the outside washing units M are driven by means of a sprocket wheel 212 fixed to one of the shafts 112 and driven by a sprocket chain 213 leading to a sprocket wheel 214 of the reduction gearing on the motor B. The shafts 112 may be intergeared if desired.

The shaft 60 of the upper rear sprockets 59 is carried in slides 215 which travel on guideways 216 disposed in the sides of the case A and a threaded bolt 217 is connected to each slide so that the shaft 60 may be moved in desired directions to maintain proper tension of the conveyor. The threaded bolts 217 pass through threaded members 218 for moving the shaft 60 in the manner and for the purpose described.

The operation of the washing machine is as follows:

The soaking bath tank K has of course been filled with a soaking solution of proper consistency preferably a caustic solution made from a suitable alkali. This soaking bath is heated to proper temperature and a plurality of bottles are assembled for loading into the machine.

The motor B is put in operation whereupon the driving pinion 7 is rotated by driving shaft 6 to actuate the gear rack 8 of the triangular gear member C. Looking at Figure 1 the direction of rotation of the shaft 6 and its supported pinion 7 is counterclockwise such movement therefore will cause the triangular gear C to move to the left as viewed in Figure 1 when the horizontal portion of the rack 8 is in engagement with the driving pinion 7 and causing movement of the triangular gear C downwardly and to the right when the right hand leg of the rack 8 engages the driving pinion 7 and upwardly and to the right when the left hand leg of the rack is in engagement with the driving pinion 7. Movement to the left being effected only when the horizontal portion of the rack engages the driving pinion.

Consequently vertical reciprocal motion is imparted to the crosshead D and swinging movement imparted to the driving link 9 for actuating the link controlled by the up and down and swinging movement of the driving link 9.

The various yokes 97 of a series are independently vertically movable depending on the size of the bottle delivered thereto as later described.

Secured across the top of a yoke 97 and forming a part thereof is a bar 101. A centering member 102 is secured to the bar. The member 102 is shaped like an hour glass in elevation with its interior corresponding to its exterior in contour. Figures 7 and 8 illustrate the interiors of the centering members 102. These members are open from end to end and receive the brushes 94 when the centering members are depressed over the brushes as later described.

Every yoke 97 is provided with one of these centering members 102.

The pusher blocks 56 are in alignment with the spindles 79 of the inside brush units there being as many of these pusher blocks 56 as there are spindles 79 and centering members 102.

The lower ends of the spindles 79 within the casing 77 are provided with glands 103 for making liquid tight the connections between the spindles and the supply pipes 88 and 89.

The outside washing unit designated generally as M comprises a series of pairs of vertically disposed rods 104 which are joined at the lower ends by connecting bars 105. A crosshead 106 moves on the several pairs of rods 104 and is connected by rods 107 with the crosshead D.

A yoke 108 is vertically slidable on a pair of rods 104. Springs 109 surrounding the rods 104 are interposed between the crosshead 106 and a yoke 108.

There are as many pairs of rods 104 as there are bottle carriers in a bridge member 65 there being four in the present instance consequently there are four yokes 108 slidable on the four pairs of rods 104 of the outside washing unit.

The upper ends of the rods 104 are supported in brackets or straps 110 suitably secured in the frame structure of the machine. Shafts 111 and 112 are disposed in parallel relation extending transversely of the machine in the outside washing unit. These shafts are preferably shaped other than cylindrical for positively driving brushes 113 secured to the shafts.

Every yoke 108 supports a vertically disposed spindle 114 the lower end of which is secured to the crosshead 106 and the upper end of which extends above the brushes 113 and is provided with a conical end member 115 against which the open end of a bottle is pressed by the pusher blocks 56 for the outside washing unit.

Another unit consisting of a spray or sterilizing unit O comprises a plurality of pairs of hollow tubes 116 which at the lower ends enter a tank 117.

The bottles in the carriers in the position X are moved downwardly being displaced from the conveyor with the crowns thereof moved into engagement with the centering members 124 and continued movement pushes these bottles clear of the conveyor and depresses the yokes 119 whereupon the bottles are subjected to spraying and sterilizing baths on the insides and outsides through the pipes 121 and the nozzles 207 in the upper ends of the tubes 116 so that the insides and outsides of the bottles in the spraying unit are completely sterilized. Should any bristles remain within or on the outside of the bottles in the position X then such spraying operation removes the bristles so that as the bottles leave the sprayer the same are completely cleansed and sterilized.

The downward movement of the crosshead D in the manner just described through the action of the collars 131 on the rods 107 causes elevation of the cover members 142, 148 and 210 to raise the centering members carried by these cover members to engage the crowns of the bottles while still supported in the bottle carriers on the conveyor. Consequently the moment the pusher blocks 56 engage the bottoms of the bottles the centering members will have contacted the crowns of the bottles and because of the configuration of the interior of the centering members center the bottles properly whereby continued downward movement of the same under influence of the pusher blocks will push the bottles from the carriers in position V over the inside washing brushes in the washing unit L, the bottles in the position W against the spindles 114 to move the bottles between the outside washing brushes and the bottles from the carriers in position X to the sterilizer or spray unit.

In the spraying unit O the spraying fluid or sterilizing fluid which is an alkali solution of greater strength than the soaking bath is discharged against the insides and outsides of the bottles through the action of the pump 126 driven by the motor B.

The above described action continues until the triangular gear C starts upwardly whereupon the crosshead is moved upwardly and the bottles then in the various units L, M, and O are moved upwardly through the actions of the crossheads 95, 106, and 118 respectively and returned to the bottle carriers in the positions V, W, and X respectively of the conveyor so that the bottles are now ready for a one step movement to the right of the upper run of the conveyor as viewed in Figures 2, 3, and 4. As the crosshead D rises the collars 131 on the rods 107 engage the sleeves 132 to raise the same to the dotted line position of Figure 6. Such movement depresses the cover members 142, 148, and 210 to lower the centering members 102 and 124 a sufficient distance as to be cleared by the crowns of the bottles carried by the conveyor as the conveyor is moved through the machine.

The parts as arranged, as will be noted, separate the carriers in the V and W positions by two steps of movement of the conveyor and the carriers between the W and X positions by two steps of the carriers so that after bottles are washed on the inside the same are given two steps of movement for engagement with the outside washers and subsequently two steps of movement to the sterilizer or spray units.

After the bottles have been returned to the conveyor in the X positions the conveyor is directed upwardly as may be observed in Figure 3 to tilt the supported bottles so that any contained liquid may drain out onto the drain board 130 and thus be returned to the chamber P containing the sterilizing solution. The bottles are then moved in step by step movement over the rinsing tank 165 and there subjected to a warm water rinse through the nozzles 172 and 173.

The bottles after leaving the warm water rinse are subjected to cold water rinse through the nozzles 174 and 175 and are then carried about downwardly to the position T where the same are ejected or unloaded from the conveyor in the manner heretofore described.

During the movements of the conveyor in the manner above described at every intermittent movement of the conveyor the bucket 181 at the left hand end of the soaking bath is raised carrying with it a bucket full of liquid and any flotsam that there may be on the bath adjacent the same and the load dumped into the strainer basket 138, the scum of course remaining in this basket and the liquid passing through the basket and returning to the bath.

It will be observed that the washing machine of the present invention subjects the bottles to the brush cleaning, spraying and sterilizing and rinsing operations all below the upper run of the conveyor so that any dirt or deleterious matter removed from the bottles during these operations does not fall on any bottles which have previously been cleansed and sterilized.

It will be observed also that the bottles are ejected or unloaded from the conveyor by engagement of the pusher blocks against the bottoms of the bottles so that the bottles after leaving the sterilizer do not have the crowns thereof engaged by any instrumentality which might possibly contaminate the otherwise sterile crowns.

The provision of the open ended spring cup carriers for the bottles allows the entry of the pusher blocks into the base ends of these carrier members to push the bottles out of the fingered ends of the same, the pusher blocks 56 remaining within the carriers during certain portions of the operations to maintain the fingers spread for receiving the bottles on return from the brushing and sterilizing operations.

The feature of tempering the bottles on entering the washing machine is important for the reason that the bottles when introduced into the hot soaking bath are warm and not cold, thus reducing breakage to a minimum.

It will be observed also that bottles of various sizes may be washed in the present machine without adjustment. Figure 7, for instance, illustrates a milk bottle of quart capacity in the M and O units and in the L unit a bottle of half-pint size is being washed next to a bottle of quart size. This is made possible by reason of the fact that there are individual operations of the pusher and associated washing and spraying units to accommodate bottles of different sizes within certain limits and also is possible because of the fact that for washing, spraying and sterilizing purposes the bottles are displaced from the conveyor and moved into contact with the brushing and spraying units.

The invention has been described herein more or less precisely as to details, yet it is to be understood that the invention is not to be limited thereby, as changes may be made in the arrangement and proportion of parts, and equivalents may be substituted without departing from the spirit and scope of the invention.

The invention is claimed as follows:

1. A bottle washing machine, in combination, a conveyor for moving bottles through said machine, a series of rotatable brushes for washing the insides of a row of bottles, means for moving a row of bottles out of said conveyor and over said brushes, an individually movable means engageable by the bottles moved out of said conveyor by said first means for retaining the bottles between said first means and said second means while out of the conveyor, said individually movable means being displaced from normal position distances commensurate with the lengths of the displaced bottles.

2. A bottle washing machine, in combination, an endless conveyor for moving bottles through the machine in a closed path, bottle brush washing and spraying units disposed inside the path of the conveyor movement, pushers for removing bottles from the conveyor and presenting the same to the washing and spraying units, individually movable abutments engageable by the removed bottles for cooperating with said pushers for supporting the removed bottles, said bottles there being subjected to washing and spraying action, means acting against said abutments for moving said abutments in directions for returning the bottles to the conveyor, means for rinsing the bottles after leaving the said units, pusher means acting against the bottoms of the bottles after the rinsing operation to eject the bottles from the conveyor in substantially horizontal position, means for receiving the thus ejected bottles and turning them upright, and means for receiving the bottles from said first mentioned receiving means and moving said bottles out of said machine.

3. A bottle washing machine, in combination, an endless conveyor for moving bottles through the machine, means for automatically inserting bottles in said conveyor, means for automatically discharging bottles from said conveyor and moving said bottles into positions for brush washing and sterilizing and returning said bottles to said conveyor, linkage for actuating all of said means and also for imparting intermittent movement to said conveyor, said linkage being effective to actuate all of said means while said conveyor is at rest, a constant feed drive shaft, a pinion thereon, and a triangular gear in mesh with said pinion for actuating the linkage in the manner stated.

4. A bottle washing machine including in combination, an endless conveyor arranged to receive bottles in rows, a row of plungers engageable against the bottoms of the bottles in a row for dislodging said row of bottles from said conveyor and moving them to washing positions, all of said plungers having the same stroke, individually supported and movable abutments aligned with said plungers and engageable with the bottles in a row when dislodged from said conveyor by said plungers, the said abutments being movable away from normal position by distances commensurate with the lengths of bottles between the plungers and abutments, and means cooperating with said abutments to urge them toward said plungers and to return said bottles to the conveyor after a predetermined length of time.

5. A bottle washing machine including in combination, a conveyor of the endless type adapted to receive rows of bottles of various sizes, a plurality of plungers for dislodging a plurality of bottles from said conveyor, a plurality of individually supported and movable abutments engageable by the bottles so dislodged, everyone of said abutments having a centering device for the reception of a bottle neck, said plungers having uniform stroke, an abutment being displaceable from normal position a distance substantially equal to the length of a bottle between it and a plunger, bottles of different lengths displacing said abutments different distances from normal position, the bottles while dislodged being retained between the plungers and abutments, and spring means acting against said abutments to oppose movement thereof by said plungers and the intervening bottles and thus retain the bottles there between and effective to return said bottles to said conveyor after a predetermined length of time.

6. A bottle washing machine including an endless conveyor, means thereon for supporting bottles in rows, plungers for dislodging a row of bottles from the conveyor, a plurality of individually supported and movable abutments in alignment with said plungers and lying below the same and engageable by a row of bottles dislodged by said plungers, movement of the plungers in discharging a row of bottles from said conveyor moving the abutments distances equal to the lengths of bottles so dislodged, a short bottle displacing an abutment a short distance and a long bottle displacing an abutment a long distance, with the bottoms of the bottles displaced moved the same distance by said plungers.

7. A bottle washing machine, in combination, means for indiscriminately receiving bottles of different sizes, means acting against the bottoms of the bottles for dislodging a plurality of bottles from said receiving means, means for washing different sized bottles while so dislodged, a plurality of individually supported and movable abutments engageable by the mouths of the different sized bottles so dislodged, the abutments being displaced by the dislodged bottles distances commensurate with the lengths of the bottles, and means acting against said abutments for returning said bottles to said receiving means after washing.

8. A bottle washing machine, including in combination an endless conveyor, means for intermittently moving said conveyor in step by step manner, a plurality of bottle holders carried by said conveyor, said holders having converging spring fingers for receiving the necks of the bottles and adapted to indiscriminately receive bottles of different sizes, means for automatically feeding bottles to said holders, said feeding means including a member having pushing engagement with the bottle bottoms, inside and outside bottle washing brushes, means including plungers for contacting the bottoms of bottles for discharging the bottles from the holders and moving the bottles over the inside washing brushes and between the outside washing brushes, said plungers entering said holders and spreading the fingers thereof for receiving the bottles therein after brush washing, and means including plungers operable against the bottle bottoms for automatically discharging bottles from the holders after washing.

9. A bottle washing machine, including an intermittently operable endless conveyor, a plurality of plates carried by said conveyor spaced certain distances apart, every plate carrying a row of bottle carriers, said carriers having similar ends open and a plurality of convergent spring fingers at the other ends, said carriers receiving bottles with the bottle necks within the fingers, a brush washing station, means for intermittently moving said conveyor in step by step manner, said conveyor being moved in one step a direction equal to the distance of the spacing of said plates, a row of plungers movable away from said conveyor and operable against the bottoms of a row of bottles in a plate at the washing station for dislodging said row of bottles from the plate and moving the bottles into washing position, means for reciprocating said plungers, said plungers entering the open ends of said carriers and spreading the carrier fingers while the bottles are dislodged, individually supported and movable spring actuated abutments aligned with said plungers for cooperating with said plungers to mainain the dislodged bottles between the plungers and abutments during bottle washing, said abutments returning said bottles to said carriers and movement of said plungers away from washing position of the bottles, said plungers maintaining said carrier fingers spread to receive the bottle bottoms when returned by action of said abutments resulting from the return of said plungers to normal position.

ROBERT J. WYNNE.
PAUL H. MEYER.